United States Patent
Pericle

(10) Patent No.: US 7,379,922 B2
(45) Date of Patent: May 27, 2008

(54) PRICING MODEL SYSTEM AND METHOD

(75) Inventor: Anthony J. Pericle, Glen Allen, VA (US)

(73) Assignee: Avanous, Inc., Glen Allen, VA (US)

( * ) Notice: Subject to any disclaimer, the term of this patent is extended or adjusted under 35 U.S.C. 154(b) by 1049 days.

(21) Appl. No.: 10/134,539

(22) Filed: Apr. 29, 2002

(65) Prior Publication Data

US 2003/0217016 A1 Nov. 20, 2003

(51) Int. Cl.
G06F 17/00 (2006.01)

(52) U.S. Cl. .................................................. 705/400
(58) Field of Classification Search ................. 705/400
See application file for complete search history.

(56) References Cited

U.S. PATENT DOCUMENTS

| | | | |
|---|---|---|---|
| 5,245,533 A | 9/1993 | Marshall | |
| 5,794,220 A | 8/1998 | Hunt | |
| 5,822,736 A | 10/1998 | Hartman et al. | |
| 5,878,400 A | 3/1999 | Carter, III | |
| 5,918,215 A | 6/1999 | Yoshioka et al. | |
| 5,933,813 A | 8/1999 | Teicher et al. | |
| 5,987,425 A | 11/1999 | Hartman et al. | |
| 6,076,071 A | 6/2000 | Freeny, Jr. | |
| 6,078,893 A | 6/2000 | Ouimet et al. | |
| 6,078,897 A * | 6/2000 | Rubin et al. ................... 705/14 | |
| 6,094,641 A | 7/2000 | Ouimet et al. | |
| 6,101,484 A | 8/2000 | Halbert et al. | |
| 6,230,150 B1 | 5/2001 | Walker et al. | |
| 6,298,330 B1 | 10/2001 | Gardenswartz et al. | |
| 6,308,162 B1 | 10/2001 | Ouimet et al. | |
| 6,334,110 B1 | 12/2001 | Walter et al. | |
| 6,944,624 B2 * | 9/2005 | Orton et al. ................. 707/102 |
| 6,963,854 B1 * | 11/2005 | Boyd et al. ................... 705/37 |
| 7,020,620 B1 * | 3/2006 | Bargnes et al. ............... 705/10 |
| 2002/0116348 A1 * | 8/2002 | Phillips et al. .............. 705/400 |

FOREIGN PATENT DOCUMENTS

WO    WO98/53415    * 11/1998

OTHER PUBLICATIONS

Business Editors and Technology Writers, "Calico Commerce Introduces First Pricing Application to Help Companies Control Profit Margins in eBusiness Selling," Business Wire, New York, Sep. 6, 2000, p. 1.*

Akre, Brian S., "Big 3 Take Stealth Tactics to Midyear Auto Pricing," Journal Record, Oklahoma City, OK, Jul. 25, 1996, p. NOPGCIT.*

* cited by examiner

Primary Examiner—John W. Hayes
Assistant Examiner—Nathan H. Erb
(74) Attorney, Agent, or Firm—John H. Thomas, P.C.

(57) ABSTRACT

A pricing model may be used by a decision maker in the evaluation of prices of numerous items to multiple customers. The present system and method facilitates targeted and strategic pricing decisions that increase profitability and avoid unnecessary risks in pricing changes. The method includes the analysis of three categories of information—sales volume, purchase frequency and gross profit percent.

12 Claims, 6 Drawing Sheets

| | PERCENTILE | |
|---|---|---|
| GPPERCENT | 0.75 | EX: .75=CONSERVATIVE BENCHMARK |
| FREQUENCY | 0.55 | EX: .55=LITTLE ABOVE AVERAGE OR MIDDLE |
| SALES | 0.55 | EX: .55=LITTLE ABOVE AVERAGE OR MIDDLE |

SINGLE MARKET FLAG ☑ CHECK=SINGLE MARKET; NOCHECK=VALUE FROM TARGITEML.txt
FOR SIMPLIFICATION AND BASED ON CURRENT P2P VERSION, *KEEP THIS BOX CHECKED.*

FIG. 2

POINT TO PROFIT - [MARGIN ANALYSIS BY ACCOUNT]    HELP | CLOSE

ACCOUNT ANALYSIS

SELECT ACCOUNT ⊙ RANK ○ NAME

| | | | | 1/1/01 - 12/31/01 | | SUMMARY DELTA STATS | | FUTURE |
|---|---|---|---|---|---|---|---|---|
| | | | | SALES$ | GP% | ITEMS | GP$S | GP% |
| VALLEY GROUP | | | REFRESH ▽ | TERRITORY 1,875,374 | 25.86% | 5 | 477 | 0.02% | 25.88% |
| SELECT ITEM SORT | | | R-&'S 6% | ACCOUNT 160,045 | 19.89% | 5 | 477 | 0.24% | |
| MARKET VARIANCE II ▽ | PRICE IT! | | R-FQ 3% | | | | | NEW | DELTA |

| MFG/CAT | DESCRIPTION | | | | | | | | | | | | | | PRICE | | GP$'S |
|---|---|---|---|---|---|---|---|---|---|---|---|---|---|---|---|---|---|
| P1 | P2 | P3 | P4 | UNITS | FQ | SALES$ | GP% | FUTDATE | TGTGP% | LPRICE CH | LGP% | CPRICE | CGP% | | | GP% | UNIT% |
| 1234 | LDSD | | PRODUCT L | | | | 94 | | | 47.08 O | | | | | 69.25 | C | 34 |
| | 2 | | | 2 BX | 1 | 16.8% | 39% 3 | | | 16.8% V | | | | CLR | 39.00 | C | 36.5% |
| 4567 | ADFLK | | PRODUCT G | | | | 29 | | | 2.89 O | | | | | 5.86 | C | 30 |
| | 10 | | | 10 BX | 1 | 24.9% | 63% 3 | | | 24.9% V | | | | CLR | 63.00 | C | 102.8% |
| 5764 | UIELS | | PRODUCT U | | | | 142 | | | 70.82 O | | | | | 85.56 | C | 29 |
| | 2 | | | 2 DZ | 1 | 15.4% | 30% 3 | | | 15.4% V | | | | CLR | 30.00 | C | 20.8% |
| 7899 | LALG | | PRODUCT B | | | | 24 | | | 7.94 O | | | | | 15.64 | C | 23 |
| | 3 | | | 3 BX | 1 | 35.0% | 67% 3 | | | 35.0% V | | | | CLR | 67.00 | C | 97.0% |

*FIG. 3*

PRICE INCREASES USING VOLUME AND VELOCITY PRICING

VOLUME AND VELOCITY PRICING (V2P)

ITEM SALES TO ACCT SALES % SELECTION          RESET

| 0.50% | ○ LOW | ○ | ◉ MEDIUM | ○ | ○ HIGH |

GP%, VOLUME, VELOCITY SELECTION

○ $   ○ $$   ◉ $$$

EXCLUDE ITEMS W/AVG PER ORDER>: [10.00] ☐

EXCLUDE ITEMS W/COST>: [50.00] ☐

EXCLUDE ITEMS W/PRICECHG>: [1] ☐
EXCLUDE CURRENT "NEW" PRICES>: ☒
EXCLUDE "NEW" ITEMS>: ☒
EXCLUDE ITEMS NOT PURCHASED PRIOR 3 MONTHS>: ☐

☐ MAX $ INCREASE  [15.00] ☐
☐ MAX % INCREASE  [40.0%] ☐

BOX MUST BE CHECKED TO ACTIVATE MAX INCREASE FUNCTIONS

ACCT EXCLUSIONS
VENDOR EXCLUSIONS
GROUP EXCLUSIONS

THIS OPTION WILL ENABLE YOU TO SELECT ITEMS WHERE RELATIVE GP%, VOLUME, AND OR VELOCITY ARE LOWER THAN BENCHMARKS. FOR EXAMPLE: "$" WILL SELECT ALL ITEMS WHERE GP% < BENCHMARK GP%. "$$" WILL SELECT ALL ITEMS WHERE GP% < BENCHMARK AND AT LEAST VOLUME OR VELOCITY < BENCHMARK. "$$$" WILL SELECT ONLY THOSE ITEMS WHERE GP%, VOLUME AND VELOCITY < BENCHMARK.

ACCOUNT: [9432101]
[TOG ALL]   [INCREASE PRICES]

FIG. 4

POINT TO PROFIT - [MARGIN ANALYSIS BY ACCOUNT]

ACCOUNT ANALYSIS

11/1/2000 - 10/31/2001     HELP   CLOSE

SELECT ACCOUNT ⦿ RANK ○ NAME   REFRESH

TUTTLE MED CENTER

| | | | | 1/1/01 - 12/31/01 | | | | SUMMARY DELTA STATS | | FUTURE |
|---|---|---|---|---|---|---|---|---|---|---|
| | | | TERRITORY | SALES$ | GP% | | | ITEMS | GP$S | GP% |
| | | | | 1,287,573 | 20.10% | | | 839 | 2,477 | 0.19% | 20.29% |

| NAME | NUMBER | CITY | 12MO SALES | GP% | RANK | GPL | ITEMS | GP$▼sD | R$s | RFq |
|---|---|---|---|---|---|---|---|---|---|---|
| TUTTLE MED CENTER | 9721592 | TUTTL | 30,616 | 21.8 | 11 | 12 | 22 | 52 | 1 | 5 |
| NORTHSIDE CLINIC | 9727711 | GENTR | 30,013 | 26.9 | 12 | 10 | 12 | 32 | 1 | 5 |
| DR. ED | 9727720 | MOUNT | 27,891 | 18.7 | 13 | 20 | 37 | 99 | 2 | 15 |
| EASTSIDE CLINIC | 9727771 | STERL | 25,971 | 13.7 | 14 | 11 | 33 | 114 | 3 | 12 |
| DR. JOHN | 9727806 | WHEAT | 25,933 | 25.8 | 15 | 18 | 11 | 24 | 1 | 4 |
| MAC CLINIC | 9727824 | SELFR | 24,837 | 21.8 | 16 | 15 | 13 | 22 | 1 | 5 |
| SPEEDY CLINIC | 9727850 | WINON | 22,093 | 13.5 | 17 | 18 | 39 | 101 | 3 | 25 |
| FAST CARE CENTER | 9727875 | PAMPA | 19,769 | 30.0 | 18 | 16 | 17 | 41 | 2 | 5 |
| OAK GROVE CLINIC | 9727882 | COLBY | 19,475 | 12.0 | 19 | 11 | 20 | 95 | 3 | 11 |
| BEST CARE CENTER | 9727927 | LEMIN | 18,444 | 20.1 | 20 | 12 | 8 | 38 | 1 | 3 |

*FIG. 5*

PRICING MODEL SYSTEM AND METHOD

The present invention relates to a pricing model for use by a decision maker evaluating prices of numerous items to multiple customers. The present software system and method facilitates targeted and strategic pricing decisions that increase profitability and avoid unnecessary risks in pricing changes.

BACKGROUND OF THE INVENTION

Wholesale distributors of a broad range of products typically sell commodity items. As such, the margins are very small. The traditional theory is that margin degradation is caused by the competition and by customers. However, probably one of the largest causes of margin degradation is a distributor's inability to manage pricing at the customer/item level. What is typically done is that distributors will set prices for a number of specific items for a given customer, and then price everything else at a general mark up/discount. This general mark up/discount creates a cap on the amount of margin generated. In order to raise margin, the decision maker can adjust upwardly the general mark up/discount. By doing this, a large percentage of the line item pricing is changed which is very visible, and therefore, very risky. Another alternative is to manage pricing at the customer/item level. However, this management of pricing at the customer/item level often has a substantial challenge in the actual number of customer/items. A typical distributor pricing decision maker may have responsibility for one hundred customers, each purchasing one hundred to two hundred unique items. The result is tens of thousands of unique customer/item combinations. As territories grow with recent trends, the pricing management responsibility will increase, and hence, the pricing management challenge will continue to grow.

There are several packages that are known which use mechanisms in groupings of items in attempt to manage pricing. These systems typically focus on only single sales property. These prior packages are not very flexible, and they allow for potentially unfavorable price changes that may put all sales at risk. One specific prior art pricing model utilized a benchmark gross profit percent as a guideline for pricing and further included a market variance sort by item which was the difference between the existing gross profit and the projected gross profit. Other prior types of solutions include systems with too many fixed assumptions and wooden rules for price setting. There was no room or not enough room for subjective manipulation and input from a pricing decision maker or makers regarding the creation of variable benchmark statistics in the categories of sales volume, frequency (velocity) and gross profit percent and how those statistics can be utilized when manipulating customer/item level pricing.

SUMMARY OF THE INVENTION

Accordingly it is an object of the present invention to overcome the foregoing limitations contained in the prior art. The present invention is a pricing model that allows a user to effectively make pricing determinations that optimize profitability and avoid unnecessary risks.

In one embodiment, the present invention is a method for determining the price for a plurality of different types of items to be presented to a specific customer. The method includes providing a sales information database comprising the sales history of items sold to a plurality of customers and the gross profit of the sale of each item to each customer. Then, for each customer, the method includes calculating the sales volume, purchase frequency and gross profit percent for each item sold to that customer. Next, for the specific customer for whom the prices are being determined, the method includes comparing the foregoing calculations of the categories of sales volume, purchase frequency and gross profit percent with corresponding sales to the other customers. The method finally includes using the comparison to reach a pricing decision for the plurality of items for sale to the specific customer. The plurality of customers may comprise all of the customers of the different types of items, or it may comprise a predetermined subgroup of all of the customers of the different types of items. The calculating step may further comprise calculating the relative percentile rank of each category of information for each item sold as compared to the sales to the plurality of customers. Further, a benchmark percentile for each category of information may be selected. Additionally, for each item, the method may include assigning a target code value for each category percentile below the benchmark percentile and then summing all of the target code values. A target code sum threshold may be selected as a requirement for eligible status of each item for a price increase. Still further, the method may include calculating a market variance delta, which is the difference between the actual gross profit of each item and a desired item gross profit. The method may alternatively include using both the target code sum and the market variance delta as threshold requirements for eligible status of each item for a price increase. The method may also include making price increases on a per unit basis equal to the market variance delta, calculated on a per unit basis, for each item having a target code sum equal to or greater than the threshold value.

In a further embodiment, the invention includes a method of calculating a sales use ratio for use in making pricing decisions. The method includes providing a data base of historical sales of a plurality of items to a specific customer, and further providing a proposed sales price list comprising price increases for some of the plurality of items. The method then includes calculating the sales risk ratio of customer sales of items with price increases as compared to the total sales to that customer. The method may include alternatively the step of predetermining a maximum sales risk ratio, and if the calculated sales risk ratio exceeds the predetermined maximum ratio, then the method includes reducing the sales price increases.

In a still further embodiment, the invention includes a method of calculating a frequency risk ratio for use in making pricing decisions. The method includes providing a database of historical sales of a plurality of items to a specific customer, and further providing a proposed sales price list comprising price increases for some of the plurality of items. The method further includes calculating the frequency risk ratio comprising the frequency per hundred items of items with sales price increases based on a proposed sales price list. The method may further include predetermining a maximum frequency risk ratio, and if the calculated frequency risk ratio exceeds the predetermined maximum ratio, then revising the sales price list.

BRIEF DESCRIPTION OF THE DRAWINGS

FIGS. 2-5 are a series of exemplary screen shots presented to a pricing decision maker in connection with a preferred embodiment of the present invention.

DETAILED DESCRIPTION

Overview

Figure 1A:
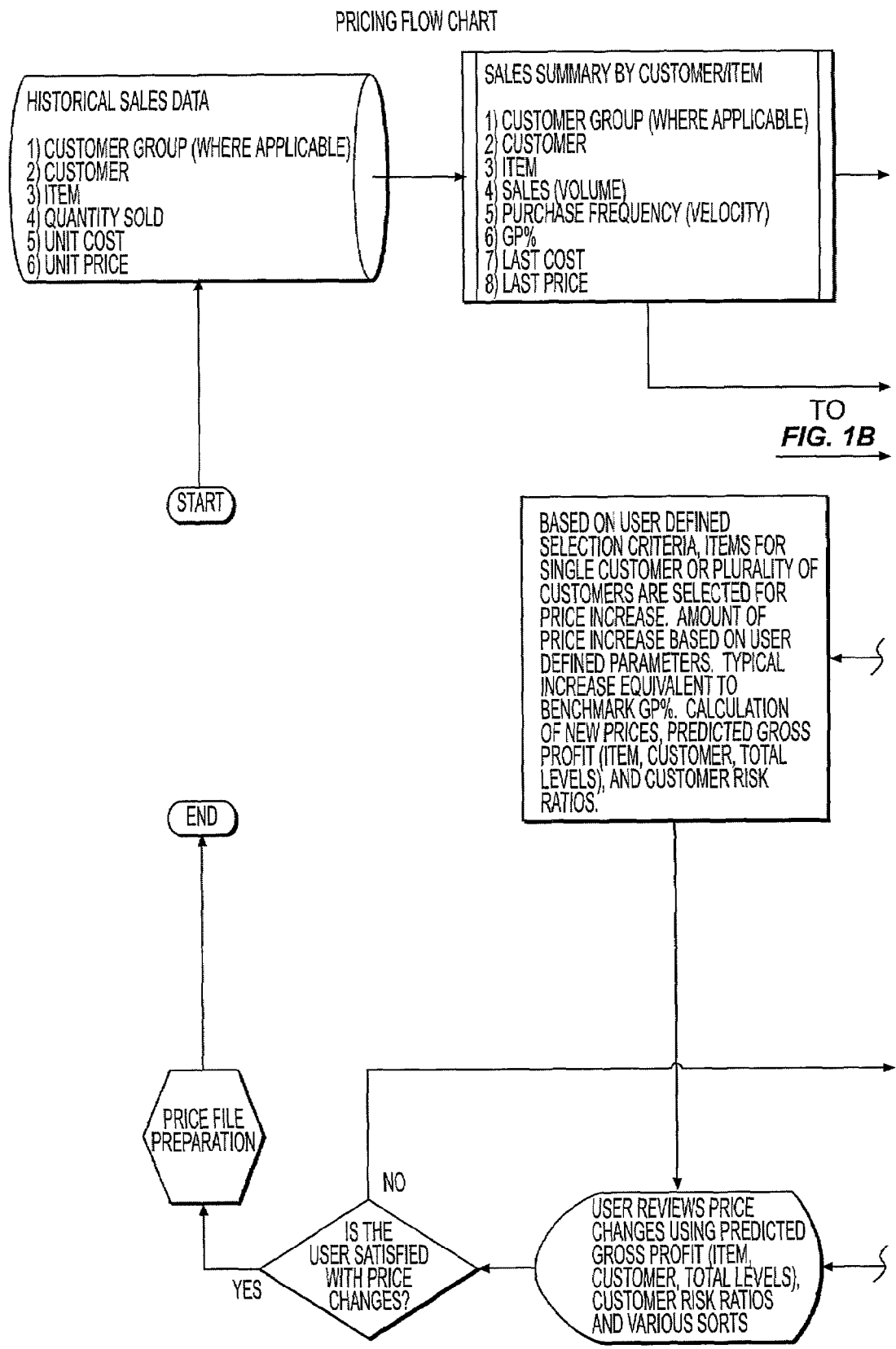
FIGS. 1A and 1B are a flow chart demonstrating a preferred embodiment of the pricing model method.

The present invention is a method of transforming historical sales data into a pricing model using subjective guidelines input by the pricing decision maker. The method is centered on the analysis of three categories of information—sales dollars (volume), purchase frequency (velocity), and gross profit percent (GP %).

In the first step, the user of the method (the pricing decision maker) takes a database of historical sales data and selects a customer grouping option. Next, the user selects benchmark percentile parameters for each of the three categories of information: sales dollar (volume), purchase frequency (velocity), and gross profit percent (GP %). Then, for each customer grouping, the items are ranked for each of the volume, velocity and GP % categories (as compared to other customers). This transformation of historical sales data calculates benchmark percentile statistics for each item for each customer grouping (or single grouping if the customer grouping option is not selected) based on the benchmark percentile parameters. These benchmark percentile statistics include values for each of the volume, velocity and GP % categories.

Second, the method transforms the data into customer specific statistics. The method calculates a target code for each customer/item record. The target code is based on the number of categories noted above (volume, velocity, GP %) where the item is at or below the benchmark percentile. For example, a widget has a target code of three for a selected customer. This means that the customer's sales volume, velocity and GP % for the widget is less than or equal to the benchmark percentile statistic in each of the categories of sales volume, velocity and GP %. Obviously, target codes of 0, 1 or 2 indicate that the item sold to the selected customer ranks at or below the benchmark percentile statistic in 0, 1 or 2 categories.

In addition to calculating a target code for each item, a market item delta is calculated by customer/item which represents the difference between actual gross profit, as calculated by sales volume and actual GP percent, and the gross profit as calculated by sales volume and the target (or benchmark) GP %. Once a target code and market item delta have been determined, customer/item records are displayed in order of greatest target code to least (primary sort) and greatest market item delta to least (secondary sort).

The third step of the method is the actual pricing model. Applying subjective parameters such as target code value, the program sets out how those parameters affect each individual item pricing for each specific customer. This allows concurrent modeling across a range of products for a specific customer and/or a range of products for multiple customers.

Finally, the program calculates customer risk ratios to give the user some indication of possible effects of price changes. The sales risk ratio (R$s) displays the percent ratio of customer sales of items with modeled price changes to the total sales for that customer. The frequency risk ratio (Rfq) evaluates customer visibility by showing the frequency (number of items per one hundred items) of items with price increases that will be seen by the customer as a result of various parameter inputs.

Of course, those having skill in this area recognize that GP % is directly related to prices. Mathematically, the calculation of GP % is the item price minus the item cost divided by the item price. Throughout this discussion herein, only the term "GP %" is used. This is a matter of wording choice only. Substantially, the benefits and use of the present invention are available whether the statistic GP % or price is used as a category for analysis. Therefore, the term and category of information "GP %" encompasses and could be used interchangeably herein with the term and category of information "price".

Figure 1B:
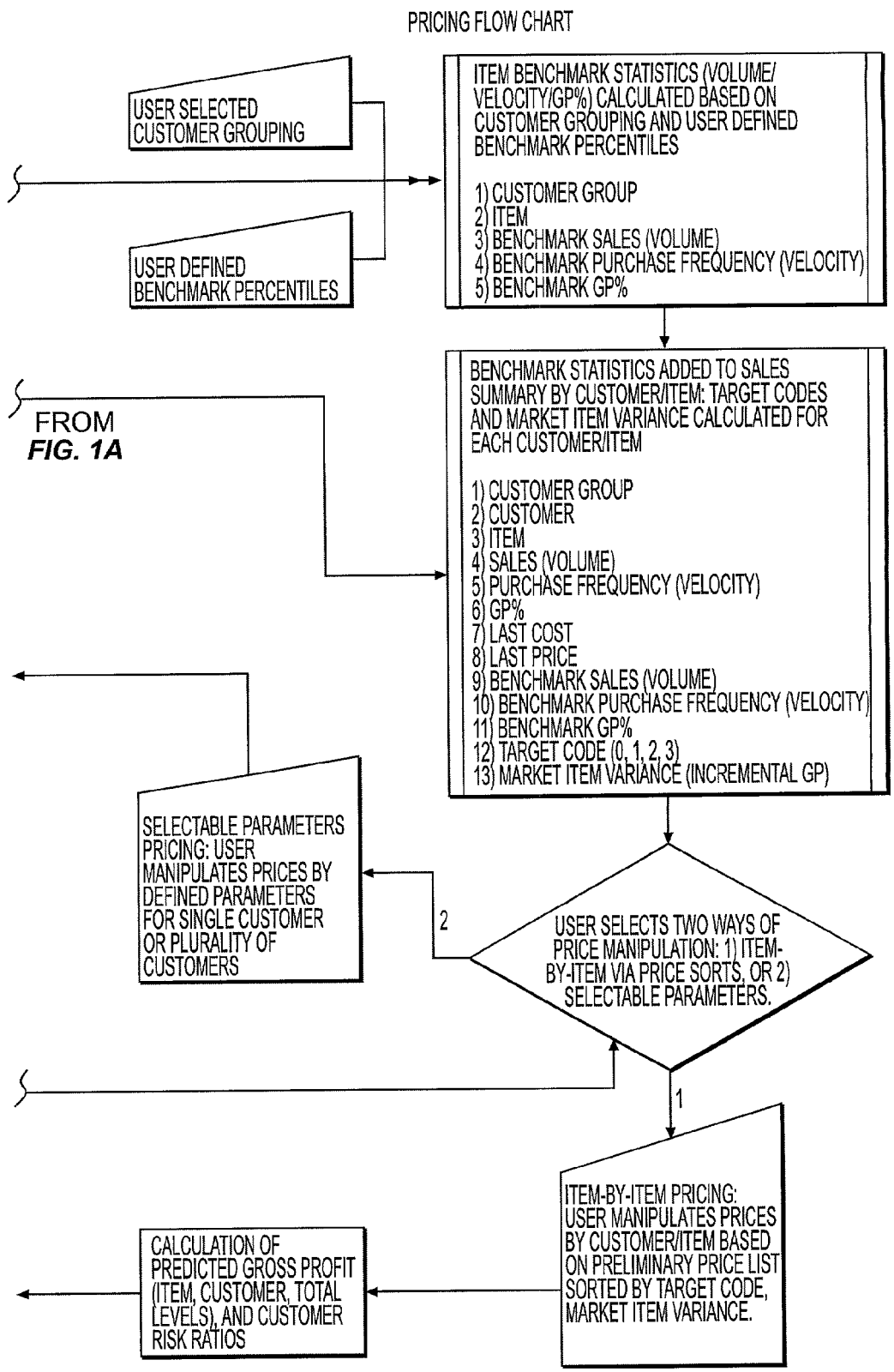

Turning now to more specific details of the invention, the following discussion addresses preferred and alternative embodiments with respect to the invention. FIGS. 1A and 1B are a flow chart that illustrates how a preferred embodiment operates and interacts with a user.

Historical Data

The present invention requires as a basic tool a database of historical sales information. This information is typically available from a company that will be instituting the disclosed pricing model. Hypothetically, however, it is possible that a new company could develop or obtain market information that could be a basis for the necessary information that will be used and processed herein.

The historical sales data required to practice the present invention includes sales volume, sales frequency and gross profit percent. The data will also inherently include unit cost and price information. This information must be available on a per customer and per item basis. The software and system of the present invention are especially useful in connection with a substantial volume of data—namely a large number of customers and a large number of different types of items.

Transformation of Historical Sales Data

The historical sales volume, sales frequency and gross profit percent categories are calculated out by percentiles. That is, for a group of customers, and for each specific item, the categories of sales volume, velocity and gross profit percent are ranked in a percentile fashion.

The user of the present invention must first select the specific customer grouping in calculating this percentile comparison. For instance, the customer grouping may be a single grouping of all of the customers. Alternatively, the user may identify a particular subgroup of customers for which to develop percentile rankings. Relevant customer subgroups are the preference of the user and may include, without limitation, groupings by geography, size of customer, purchase volume of customer, type of business, subject matter of practice, etc.

Once the relative items are ranked by percentile using the selected grouping, the user then has the opportunity to set a subjective benchmark percentile for the purposes of setting pricing. The user may assign the same percentile benchmark for each category of information. Alternatively, the user may assign different percentile benchmarks for the different categories of sales information. This allows the user to attach more weight or importance to a particular category of information. Alternatively, this may allow a supervisory user to predetermine the weight or importance of the various categories of information that may then be manipulated downstream by a front line sales person, for instance.

Target Code Value

Once benchmark percentiles are calculated, each item may be assigned a target code value. The target code value is an arbitrary value that may be subjectively defined by the user of the present system. Preferably, a target code value is assigned for each category of sales information. The item may be assigned a target code value with respect to whether or not the particular items meet the benchmark percentile in a given category of sales information. The target value weight may be a simple binary weight where the item either reaches the benchmark threshold or not. Alternatively, the target code value may be variable depending on how close or how far away from the benchmark percentile the item is. Still further, the target code value may vary by category of information in order to allow the user or a supervisory user to emphasize a particular category of information that is relevant for a particular using company.

In a preferred embodiment, and as noted in FIGS. 1A and 1B, each category is assigned a target code value of 1. The standard for awarding the target code value is whether or not the customer/item sales information meets the corresponding benchmark categories of volume, velocity and/or GP %. For example, the qualifier for a target code is GP %. If a customer/item GP % is less than the benchmark GP %, then the target code is 1. Therefore, assuming the three categories of information, each item may receive a target code value sum of 0, 1,2 or 3.

The target code value is used to identify specific items that could be eligible for a price change. In a preferred embodiment, the items for review are sorted by target code value sum so that the items with the highest target code value sum (i.e., failure to meet benchmark percentiles in all three categories) are identified first. In this way, the lowest performing items (based on the benchmark percentiles) are highlighted and presented for a potential price change. In summary, therefore, the target code value sum is used as one method of highlighting items that are potentially ripe for a price increase.

Market Variance Delta

Another sorting method to identify potential items for price increases is the calculation of a market variance delta. The market variance delta is the difference between the actual gross profit of a given item versus the selected or benchmark gross profit that is subjectively selected by a user of the present system and software. The benchmark gross profit percent may be set by a supervisor or otherwise by the immediate user. In a preferred embodiment, the market variance delta is a secondary sort after the target code values noted earlier. In this way, the items with the highest target code value sums are highlighted in the order of their highest market variance delta. Therefore, the market variance delta is a further tool to highlight specific items for potential price increases.

In the example that follows, and as shown specifically in FIG. 3, the market variance delta is a per item calculation based on the historical number of units of a particular item that were sold and what the total profits would have been. A market variance delta may also be expressed as an incremental dollar amount which is the difference between the historical last price and the new price necessary to obtain the benchmark gross profit.

Alternative Sorting Priorities

The present invention could be used or incorporate any type of sorting priority desired by a user. These sorting priorities could use the same raw sales data noted herein and include a different manipulation thereof. Still further, other sorting priorities could be calculated based on further sales data that may be available or made available, such as grouping items within similar categories. Items could be classified in one or more category groupings, and then these item groupings could be a further sorting parameter used to prioritize and review items for possible price changes.

Price Setting

Once the sales data has been transformed and sorted (prioritized) as noted earlier herein, different pricing mechanisms may be incorporated into the system. Generally speaking, the user may select two ways to make price modifications. Inevitably, both methods could be and often are used in part to reach a final pricing decision. First, a user may manipulate prices automatically by defining certain parameters based on the information calculated earlier herein. Or second, a user may manipulate prices on a customer/item basis assisted by the information and sorting described earlier herein.

Preferably the target value and market variance delta are used to create a preliminary pricing list. The user may identify items having the highest target code values for an increase in price up to an amount that would give the benchmark GP %. Other subjective increases or other pricing parameters, as well as identification of products for sales price increase can be devised and programmed into the present system. The foregoing target code value and market variance delta standards are preferred when obtaining a preliminary price increase list.

Once the parameters for making a price increase are input according to the preferences of the user, the user may then review the item price increases for subjective revision on a per item basis. This review allows for fine-tuning of the pricing based on specific product and customer knowledge. An advantage of the present system is that the only products that were included in the price list were those that were underperforming with respect to the percentile rankings as measured by the target code values, the optimal GP % (typically the benchmark GP %) and by other subjective parameters. By loosening or tightening the standards in evaluation of the target code sum, for instance, the number of items that will receive a price change may be increased or decreased depending on strategic pricing goals.

Customer Risk Ratios

Once the foregoing price changes have been preliminarily made, the user may wish to evaluate the risk of making all of the proposed changes. The present invention includes two types of risk ratios that are used to gauge the desirability of the preliminary price list increase. Both of these risk ratios are at the customer level. The advantage is that the user can more easily identify areas that are in need of more detailed review should the ratios fall outside a predetermined percent.

First, once the preliminary price increase is determined, a sales risk ratio may be calculated. The sales risk ratio determines on a per customer basis the percent ratio of customer sales of items with price increases based on the pricing decision verses customer sales overall. This gives the pricing decision maker/user the opportunity to project the effect of the potential price increase to the specific customer. The user may decide on a maximum threshold sales risk ratio that, if exceeded, the user should reevaluate and revise the pricing changes in the preliminary pricing list.

A further customer risk ratio that is included in a preferred embodiment of the present invention is the frequency risk ratio. The frequency risk ratio is a calculation of the frequency per hundred items of items with sales price increases projected on a per customer basis. This way, the pricing decision maker may evaluate the visibility of the price changes to the potential customer. As with the sales risk ratio noted above, the user may set a specific threshold value for a maximum frequency risk ratio. If the calculated frequency risk ratio is too large, then the user will need to revise the projected price list increases in order to reduce the frequency risk ratio.

EXAMPLE

The following example is an outline of a commercial embodiment of the present invention. In this embodiment, the data transformation function is performed by an SQL Server. The benchmark statistic calculation engine is MS and Visual Basic for Applications. The optimal benchmark statistic calculation engine is SQL Server and Visual Basic. The price model engine is MS access and Visual Basic for Applications. The optimal price model engine is Visual Basic.

Referring now to FIGS. 2-5, there is shown a series of representative computer screen shots that are exemplary of how a user actually works with the software program to obtain and use a pricing model. This commercial embodiment is sold under the trademark Advanous Point To Profit (P2P). An earlier version of the current program exists under the trademark ADVANOUS Volume and Velocity Pricing (AV2P) Version 1.0 and is available at the following website, www.advanous.com, and is incorporated by reference herein as if set forth and disclosed in its entirety.

As noted earlier, in preparation for the user to execute the price modeling program, the historical sales data has already been input into a server and transformed as noted in the prior discussion and in the flow chart shown in FIGS. 1A and 1B.

FIG. 2 is the initial step where the user selects a predetermined customer grouping (single market) or not (all information) and then sets the benchmark percentiles. As demonstrated in FIG. 2, a hypothetical user has selected a single market and has set the benchmark percentiles as 0.75, 0.55, and 0.55 for GP %, frequency, and sales, respectively.

The second screen, FIG. 3, illustrates an Account Analysis of items of a specific customer. The items are sorted first by target code and secondarily by market variance. As illustrated in FIG. 3, a New Price Column has been automatically generated to increase benchmark or target gross profit percent. The resulting effects of that change are shown. This is an example of a screen shot where the user is evaluating on a per customer/item basis the effect of a projected price change. Each product is evaluated individually, based on the prioritization of the target code and market variance sorting functions.

FIG. 4 is a screen that allows a user to set a variety of predetermined parameters for automatic (across all items for a single customer or all items for a plurality of customers) price increases. On this screen, the "$" symbol indicates the target code ($=1, $$=2, $$$=3). Maximum increases by dollar amount and/or percent may be input. The price increase will be the benchmark GP %, unless one of the Max Increase options is selected. Other pricing parameters available on this screen are self-explanatory.

Finally, FIG. 5 illustrates an Account Analysis screen shot that broadly illustrates by customer the effects of a proposed price increase. This is a convenient screen where the user can review the item prices changed, projected increase in gross profit and risk ratios described earlier. This particular screen allows the user a global overview of the effect of the proposed price changes on a per customer basis. In the event that any of the variables, in particular the risk ratios appear high, then the pricing decision maker can reevaluate each of those customers in more detail—for instance on a per item basis.

Although the invention has been described in detail for the purpose of illustration, it is to be understood and appreciated that such detail is solely for the purpose of example, and that other variations, modifications and applications of the invention can be made by those skilled in the art without departing from the spirit and scope of the invention.

What is claimed is:

1. A method for determining a price for a plurality of different types of items to be presented to a specific customer, the method comprising the steps of: providing a sales information database comprising a) the sales history of items sold to a plurality of customers, and b) the gross profit of the sale of each item to each customer; for each customer, calculating the sales volume, purchase frequency and gross profit percent for each item sold to that customer, each of sales volume, purchase frequency, and the gross profit percent being a category of information; for the specific customer for whom the prices are being determined, comparing the foregoing calculation of the categories of sales volume, purchase frequency and gross profit percent with corresponding sales to the other customers; calculating, for each item sold, a relative percentile rank of each category as compared to the sales to the plurality of customers; receiving, from a user, a benchmark percentile for at least one category; receiving, from the user, a desired item gross profit; calculating a market variance delta, which is the difference between the actual gross profit of each item and the desired item gross profit; generating a proposed list of items for which the price to the specific customer is recommended to be increased, based on the market variance delta and based on a difference between the relative percentile rank and the benchmark percentile for at least one category; and displaying the proposed list of items to the user in a tangible form perceivable to the user.

2. The method described in claim 1, wherein the plurality of customers comprises all of the customers of the different types of items.

3. The method described in claim 1, wherein the plurality of customers comprises a predetermined subgroup of all the customers of the different types of items.

4. The method described in claim 1, further comprising receiving, from the user a benchmark percentile for all the categories of information.

5. The method described in claim 4, further comprising: for each item, assigning a target code value for each category for which the relative percentile rank is below the benchmark percentile, the target code value being either a binary or weighted value indicative of the difference between the relative percentile rank and the benchmark percentile; and summing all of the target code values.

6. The method described in claim 5, further comprising receiving, from the user a target code sum threshold as a requirement for eligible status of each item for a price increase, such that the generated proposed list only includes items for which the target code value sum is equal to or greater than the target code sum threshold.

7. The method described in claim 6, wherein the generated proposed list only includes items for which the actual gross profit is less than the desired item gross profit.

8. The method described in claim 7, wherein the proposed list of items comprises an increased price on a per unit basis equal to the market variance delta, calculated on a per unit basis, for each item having a target code value sum equal to or greater than the target code sum threshold.

9. The method described in claim 1, further comprising the step of calculating a sales risk ratio comprising the ratio of
   a. customer sales of items with price increases in the proposed list to
   b. customer sales, overall,
   wherein the proposed list of items is reduced based on the sales risk ratio.

10. The method described in claim 1, further comprising the step of calculating a frequency risk ratio comprising the frequency per hundred items of items with price increases in the proposed list, wherein the proposed list of items is reduced based on the frequency risk ratio.

11. The method described in claim 9, further comprising receiving, from the user a maximum sales risk ratio, and if the calculated sales risk ratio exceeds the received maximum sales risk ratio, then reducing the sales price increases in the proposed list.

12. The method described in claim 11, further comprising receiving, from the user a maximum frequency risk ratio, and if the calculated frequency risk ratio exceeds the received maximum frequency risk ratio, then reducing the number of items in the proposed list.

* * * * *